United States Patent [19]

Krage

[11] Patent Number: 4,836,015

[45] Date of Patent: Jun. 6, 1989

[54] METHOD AND APPARATUS FOR DETERMINING THE COMPRESSION RATIO OF AN ENGINE CYLINDER

[75] Inventor: Mark K. Krage, Royal Oak, Mich.

[73] Assignee: General Motors Corporation, Detroit, Mich.

[21] Appl. No.: 206,444

[22] Filed: Jun. 14, 1988

[51] Int. Cl.$^4$ ............................................. G01M 15/00
[52] U.S. Cl. ..................................... 73/117.2; 364/558
[58] Field of Search .................... 73/117.3, 117.2, 116, 73/115; 364/558

[56] References Cited

U.S. PATENT DOCUMENTS 4,505,152  3/1985  Haddox ............................ 73/115 X Primary Examiner—Jerry W. Myracle
Attorney, Agent, or Firm—C. R. Meland

[57] ABSTRACT

A method of determining the compression ratio of a cylinder of an internal combustion engine. While the engine is being driven by a prime mover a PV curve is developed which is stored in the memory of a microprocessor. The unswept volume of the cylinder is determined by trying various values of unswept volume in the function $PV^n = C$ and determining which value of unswept volume causes the curve developed by this function to best fit the stored curve. Compression ratio is determined after the unswept volume is determined.

4 Claims, 2 Drawing Sheets

METHOD AND APPARATUS FOR DETERMINING THE COMPRESSION RATIO OF AN ENGINE CYLINDER

This invention relates to a method and apparatus for determining the compression ratio of a cylinder of an internal combustion engine.

In the manufacture of internal combustion engines it is desirable to be able to determine whether or not the compression ratio of an engine meets compression ratio specifications. In the past, this has been accomplished by very tedious methods including measurement of liquid displacement.

The present invention is concerned with determining compression ratio by using cylinder pressure-volume information obtained from a motored engine. Thus, it is known that while an engine is motored the cylinder pressure and volume vary according to a function $PV^n = C$ where P equals cylinder pressure, V equals cylinder volume, C is a constant and n is a constant which is related to the characteristic of the gas in the cylinder. The cylinder volume V varies, dependent upon piston position and is made up of some portion of the swept volume VS and the unswept volume VU. The unswept volume corresponds to the so-called clearance volume. The swept volume of an engine is a fixed known factor that is related to engine specifications and it is equal to the volume swept as the piston moves from bottom dead center (BDC) to top dead center (TDC). However, unswept volume VU has variability due to casting tolerances of the head and head gasket thickness variations. Since compression ratio equals (VU+VS)/VU it becomes necessary to determine the unknown unswept volume VU or clearance volume before compression ratio can be determined.

It accordingly is an object of this invention to provide a method and apparatus for determining the compression ratio of an engine cylinder by determining unswept volume of the engine cylinder wherein the unswept volume is determined by detecting and processing engine cylinder pressure and volume information. More specifically, this invention operates to detect engine cylinder pressure as the engine piston moves between bottom dead center (BDC) and top dead center (TDC). During this movement, a series of electrical position pulses that are related to engine crankshaft and piston position are developed. At the occurrence of each position pulse the magnitude or amplitude of an engine pressure signal is digitized and stored in a memory. As a result of this processing the memory will contain a digitized representation of a PV curve that was developed as the piston moved from BDC to TDC. Once this PV curve is developed and stored the unswept volume can be determined. Thus, the curve will be defined by the function $PV^n = C$. One method of determining VU is to try various values of VU until a value is selected that causes the function $PV^n = C$ to be satisfied.

IN THE DRAWINGS

Figure 1:
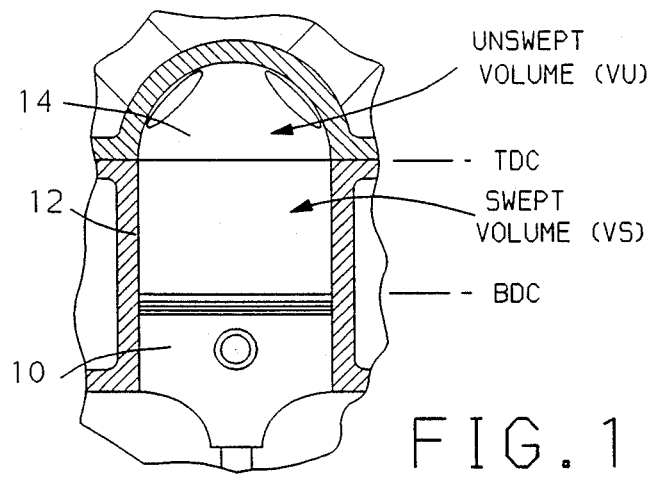
FIG. 1 is a diagrammatic illustration of a piston and cylinder of an internal combustion engine.

Referring now to the drawings and more particularly to FIG. 1, a diagrammatic illustration of a piston and cylinder of an internal combustion engine is illustrated and which will be used to define terms that will be used in the description of this invention. In FIG. 1, an engine piston 10 reciprocates in a cylinder 12 and the engine has a head 14. The piston is shown in its bottom dead center position BDC and as the piston moves from the bottom dead center position BDC to the top dead center position TDC it sweeps a volume VS shown in FIG. 1 which is the swept volume. The unswept volume VU or clearance volume is the cylinder volume that exists when the top edge of the piston is at TDC. In the future description of this invention it will be considered that the instantaneous cylinder volume V is equal to some portion VSD of VS added to VU. When the piston is at BDC the cylinder volume V=VS+VU since VSD is equal to VS. If the piston were half way between BDC and TDC the cylinder volume V would be one-half of VS added to VU and VSD would equal one-half of VS. In the future description of this invention, VSD will be used to identify a piston position related volume that has a piston position relationship to VS.

Further, it will be assumed that the compression ratio of the cylinder will equal (VU+VS)/VU.

Figure 2:
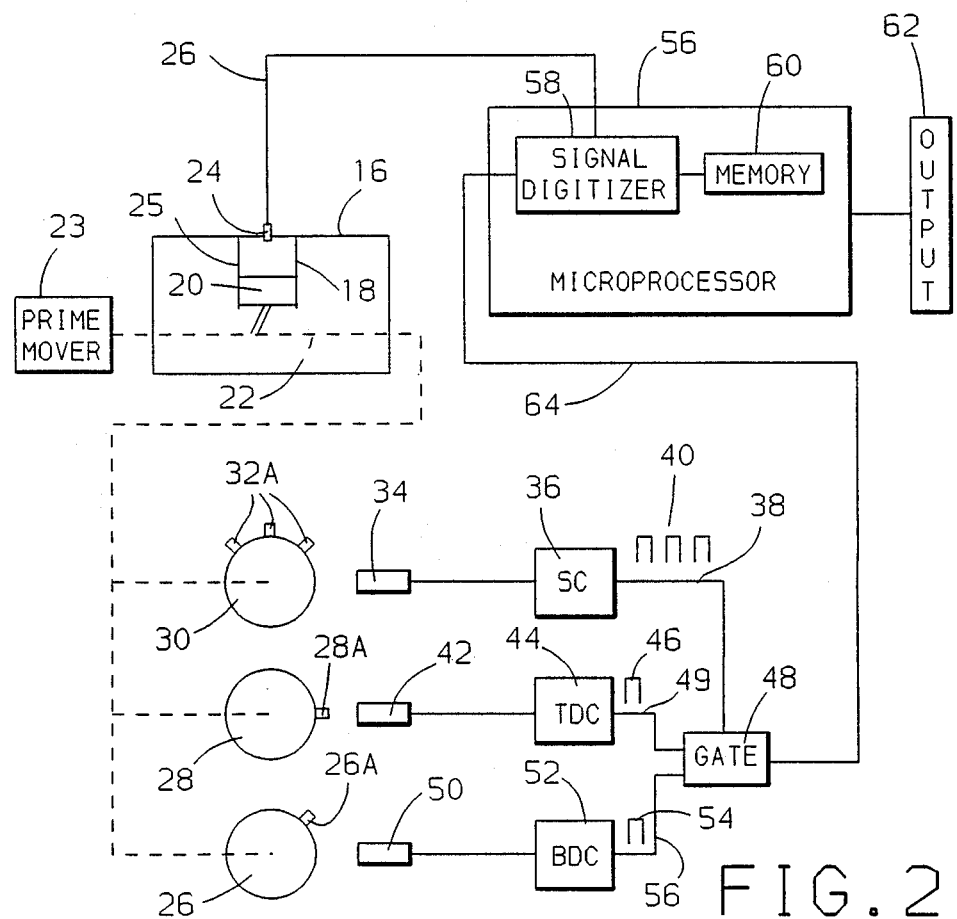
FIG. 2 illustrates apparatus made in accordance with this invention for determining the compression ratio of an engine cylinder.

Referring now to FIG. 2, an internal combustion engine 16 is illustrated which has a cylinder 18 and a piston 20 that reciprocates in the cylinder. The piston 20 is connected to the crankshaft 22 of the engine. The crankshaft 22 is also connected to a prime mover 23 which may be an electric motor. The prime mover 23 drives the engine 16 during the time that compression ratio is being determined.

A pressure transducer 24 is located so as to sense the pressure in cylinder 25. The pressure transducer provides an electrical signal on conductor or line 26 the amplitude or magnitude of which is a function of cylinder pressure. The crankshaft 22 drives three wheels 26, 28 and 30. The wheel 30 has a plurality of teeth 32A which are equally circumferentially spaced. Only three teeth are shown but it is to be understood that the entire periphery of the wheel has teeth. The teeth cooperate with a magnetic pick-up 34 that develops a voltage as the teeth pass the pick-up. This voltage is applied to a signal conditioner 36 and the output of the signal conditioner 36 that is applied to line 38 is a series of square wave pulses 40. These pulses 40 are equally spaced and each pulse occurs at a related position of the crankshaft. These pulses therefore represent crankshaft and piston position. In order to improve resolution a phase locked loop may be provided as disclosed in the U.S. Pat. No. 4,667,510 to Schroeder so that a pulse may occur for example every 0.10 degree of engine crankshaft rotation.

The wheel 28 has one tooth 28A and the wheel 26 has one tooth 26A. As tooth 28A passes magnetic pick-up 42 a voltage is developed which is applied to a TDC signal conditioning circuit 44. The output of circuit 44 is a single pulse 46 which is applied to a gate circuit 48 by line 49. In a similar fashion, when tooth 26A passes magnetic pick-up 50 a voltage is developed which is applied to a BDC signal conditioning circuit 52. The output of circuit 52 is a single pulse 54 which is applied to gate 48 by a line 56.

The wheels 26 and 28 are so attached to crankshaft 22 and the teeth 28A and 26A are so relatively positioned that pulse 54 is developed when piston 20 is at the BDC position and pulse 46 is subsequently developed when piston 20 reaches the TDC position.

The system of FIG. 2 has a programmed microprocessor 56 which includes a signal digitizer 58 and memory 60. The output of microprocessor 56 is applied to an output device 62 which may be a digital display.

The signal digitizer 58 is connected to line 26 and to the output of gate 48 via line 64.

The operation of the system shown in FIG. 2 will now be described. Assume that engine 16 is being driven by prime mover 23. With the engine being driven, the BDC 54 signal will be applied to gate 48 and this signal causes the gate to be actuated to a condition to pass position pulses 40 to signal digitizer 58. At this time the signal digitizer 58 is also receiving a signal on line 26 the amplitude of which is a function of the pressure in cylinder 18.

Figure 3:
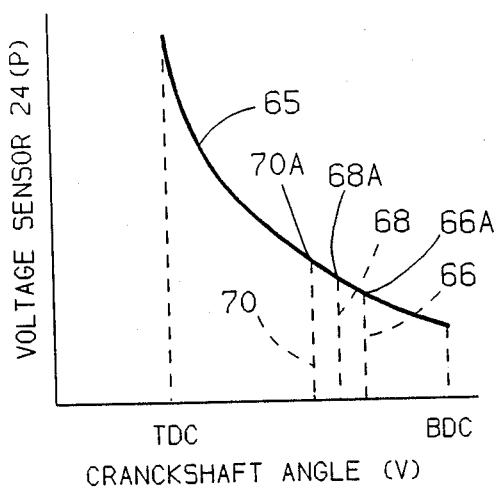
FIG. 3 is a curve of engine crankshaft position or angle plotted against the amplitude of the output voltage of a pressure sensor which senses engine cylinder pressure.

In FIG. 3, a curve 65 is illustrated which plots the output voltage of sensor 24 against the crank angle of the engine crankshaft. This curve 65 represents the type of electrical signal that is developed by transducer 26 as a function of cylinder volume and piston position. Cylinder volume V, of course, corresponds to crankshaft and piston position and the voltage output of sensor 24 represents cylinder pressure P. In FIG. 3, the three vertical lines 66, 68 and 70 represent three different crankshaft positions that occur in synchronism with the occurrence of three consecutive pulses 40. At crankshaft position 66 curve 65 has an amplitude 66A and at positions 68 and 70 it has amplitudes 68A and 70A. At crankshaft position 66, digitizer 58 converts the amplitude 66A to a digital signal which in turn is stored in an addressable memory location of memory 60. The memory location corresponds to a crankshaft position. The same thing happens at crankshaft positions 68 and 70. Further, although only three crankshaft positions have been illustrated, it is to be understood that the entire curve 65 is digitized at consecutively occurring crankshaft positions between BDC and TDC. In this regard, it is noted that when pulse 46 occurs at TDC the gate 48 is actuated to terminate the supply of position pulses 40 to digitizer 58 so that the digitizer no longer digitizes the curve 65 and no digitized information is supplied to memory 60 after pulse 46 occurs.

In summary, the entire curve 65 is digitized between BDC and TDC as a function of engine crankshaft position or crank angle so that when piston has moved from BDC to TDC the memory 60 will contain at various addressable memory locations that respectively correspond to various crankshaft positions a digital representation of the amplitude of curve 65 for each occurrence of a crankshaft position pulse 40.

Preferably, data shown in FIG. 3 is taken for several engine cycles and an average of the curve 65 is generated.

Figure 4:
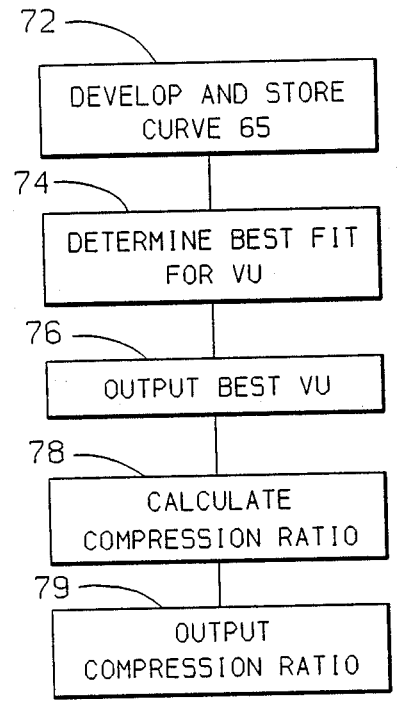
FIG. 4 illustrates a program flow diagram that is used to program the microprocessor shown in FIG. 2.

When final data for curve 65 has been developed this data is processed in accordance with the flow diagram of FIG. 4 which is the program that is executed by microprocessor 56. The memory 60 can contain the program instructions which will now be described.

In block or step 72 the microprocessor or computer 56 acquires the digital data represented by curve 65 of FIG. 3. Thus, at the completion of this step the memory 60 will have stored therein digital data that represents the output voltage of sensor 24 for each consecutive crankshaft position. This data, of course, also represents a PV curve between BDC and TDC. Further, during the step 72 consecutively occurring values of VSD are computed and stored for each crankshaft position. Thus, pulses 40 are counted from the occurrence of BDC and as the piston moves toward TDC the value VSD is consecutively computed. VSD, as previously mentioned, is a function of VS which is a constant for a given engine. Further, as previously mentioned, VSD varies with piston position and is equal to one-half VS when the piston is midway BDC and TDC. VSD therefore varies from VS to zero as the piston move from BDC to TDC.

When the digital data that represents curve 65 and VSD has been developed and stored the program proceeds to block or step 74. In this step the unknown unswept volume VU is determined by trying various values of VU and then selecting a value VU that will cause a best fit with the curve 65. In this regard, and as pointed out previously, the curve 65 is defined by the equation $PV^n = C$. In this equation V is equal to some piston position related function VSD of VS added to the unknown unswept volume VU. The memory 60 contains a digital representation of a plurality of values VU which are close to the actual expected value of VU for a proper engine VU. In step 74 the microprocessor solves the equation $PV^n = C$ or $P(VSD + VU)^n = C$ for each crankshaft position where VSD depends on piston position and where one of a plurality of values of VU has been selected. VSD, as previously described, is determined from crank angle information. The value of P that is used in the equation corresponds to detected P for a given crankshaft position. When the microprocessor solves this equation it develop another hypothetical curve like curve 65 which is stored in memory 60. The microprocessor then determines how close the hypothetical curve is to the actual curve 65 or in other words, compares the curves. This type of processing continues until a value of VU is selected that provides a hypothetical curve that best fits or matches the actual curve 65. The curve fitting process can be carried out by a known curve fitting process in which a coefficient of determination ($r^2$) is calculated.

After VU has been determined, in block or step 74, the block or step outputs the value VU. The system has no determined the actual value of the unswept volume VU. In step or block 76 the microprocessor determines the compression ratio by solving the equation (VU + VS)/VU. After the compression ratio is determined the step 79 outputs the compression ratio which is then displayed by display 62.

Figure 5:
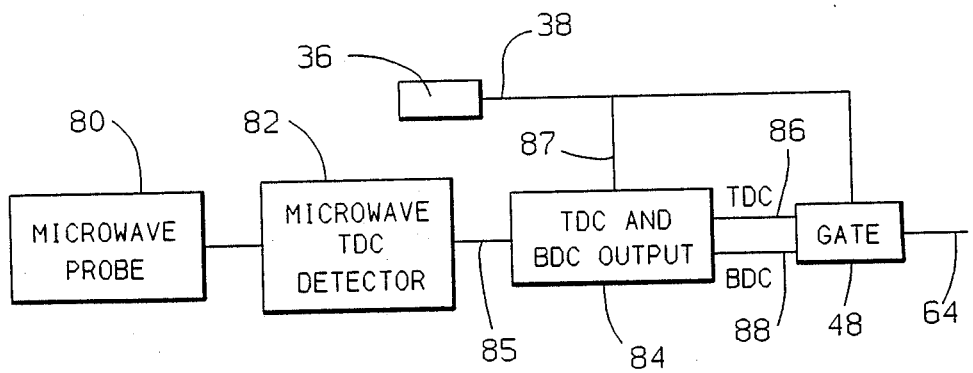
FIG. 5 illustrates a modification that can be made to the system shown in FIG. 2.

FIG. 5 illustrates a modification that can be made to the system of FIG. 2. In FIG. 5, a microwave TDC detection system is illustrated in block diagram form. This system is of the type disclosed in the United States patent to Krage et al. U.S. Pat. No. 4,384,480 which is incorporated herein by reference. In FIG. 5, reference numeral 80 designates a microwave probe that is associated with cylinder 18. The microwave TDC detector 82 determines the TDC crankshaft angle and outputs this to control circuit 84 via line 85. The control circuit 84 receives position pulses 40 on line 87. The control circuit 84 includes suitable counting apparatus which, in response to position pulses (line 87) and a TDC signal on line 85, develops output signals on lines 86 and 88. The signal on line 86 is developed at TDC and the signal on line 88 is developed at BDC. These signals are applied to gate 48 which operates in the same manner as explained in connection with the explanation of FIG. 2.

The advantage of using the modification shown in FIG. 5 is that some engine plants are equipped with microwave timing apparatus of the type described in the above-referenced U.S. Pat. No. 4,384,480. Thus, it would be desirable to check compression ratio by using as much of the microwave timing apparatus as possible. In this regard, it is noted that the microwave timing apparatus shown in the above-referenced U.S. Pat. No. 4,384,480 has a microprocessor and this microprocessor, with suitable programming, could be used to check compression ratio in a manner that has been described.

This invention has been described in connection with developing the PV curve of FIG. 3 during the time that the piston moves between BDC and TDC. The method of this invention is also applicable to a method wherein the PV curve would be developed during the expansion stroke of the piston; that is, during the time that the piston moves between TDC and BDC.

The embodiments of the invention in which an exclusive property or privilege is claimed are defined as follows:

1. A method of determining the compression ratio of a cylinder of an internal combustion engine, the steps comprising, driving the engine, while the engine is being driven sensing the pressure in the cylinder and consecutively occurring positions of the piston of the engine as the piston moves a distance corresponding to the distance between the bottom dead center and top dead center positions of the piston, developing and storing an electrical waveform in response to the sensing of the pressure and in response to the sensing of the consecutively occurring piston positions that represent cylinder pressure values as a function of piston position, said engine having an unswept volume VU and a swept volume VS corresponding to movement of the piston between said positions, said waveform at each piston position being defined by the equation $PV^n = C$, where n and C are constants, where P equals cylinder pressure and where V equals cylinder volume, said volume V for a given piston position being equal to VU + VSD where VSD is a piston dependent volume that has a piston position dependent relationship to the swept volume VS of the cylinder, determining VSD for each piston position, determining a value of VU which would cause a hypothetical waveform to be developed that substantially coincides with the developed waveform where the hypothetical waveform is defined by the equation $P(VSD + VU)^n = C$, and then computing compression ratio utilizing the determined value of VU.

2. A method of determining the compression ratio of a cylinder of an internal combustion engine, the steps comprising, developing an electrical signal that represents cylinder pressure at a plurality of positions of the piston of the engine as the piston moves a distance corresponding to the distance between the bottom dead center and top dead center positions of the piston, said engine having an unswept volume VU and a swept volume VS that corresponds to movement of said piston between said positions, in response to said electrical signal developing and storing electrical data that represents cylinder pressure P at each of a plurality of piston positions, said data being defined by the equation $PV^n = C$ where n and C are constants, where P equals cylinder pressure and where V equals cylinder volume, said volume V for a given piston position being equal to VU + VSD where VSD is a piston position dependent volume that has a piston dependent relationship to VS, determining VSD for each piston position, determining the value VU that will cause data developed by the equation $P(VSD + VU)^n = C$ to correspond to the developed data, and then utilizing the value VU to determine compression ratio.

3. A method of determining the compression ratio of a cylinder of an internal combustion engine, the steps comprising, driving the engine, while the engine is being driven sensing the pressure in the cylinder and consecutively occurring positions of the piston of the engine as the piston moves between bottom dead center BDC and top dead center TDC, developing and storing an electrical waveform in response to the sensing of the pressure and in response to the sensing of the consecutively occurring piston positions that represent cylinder pressure values as a function of piston position, said engine having an unswept volume VU and a swept volume VS corresponding to movement of the piston between BDC and TDC, said waveform at each piston position being defined by the equation $PV^n = C$ where n and C are constants, where P equals cylinder pressure and where V equals cylinder volume, said volume V for a given piston position being equal to VU + VSD where VSD is a piston dependent volume that has a piston position dependent relationship to the swept volume VS of the cylinder, determining VSD for each piston position, determining a value of VU which would cause a hypothetical waveform to be developed that substantially coincides with the developed waveform where the hypothetical waveform is defined by the equation $P(VSD + VU)^n = C$, and then computing compression ratio utilizing the determined value of VU.

4. A method of determining the compression ratio of a cylinder of an internal combustion engine, the steps comprising, developing an electrical signal that represents cylinder pressure at a plurality of positions of the piston of the engine as the piston moves between bottom dead center BDC and top dead center TDC, said engine having an unswept volume VU and a swept volume VS that corresponds to movement of said piston between BDC and TDC, in response to said electrical signal developing and storing electrical data that represents cylinder pressure P at each of a plurality of piston positions, said data being defined by the equation $PV^n = C$ where n and C are constants, where P equals cylinder pressure and where V equals cylinder volume, said volume V for a given piston position being equal to VU + VSD where VSD is a piston position dependent volume that has a piston dependent relationship to VS, determining VSD for each piston position, determining the value VU that will cause data developed by the equation $P(VSD + VU)^n = C$ to correspond to the developed data, and then utilizing the value VU to determine compression ratio.

* * * * *